(12) United States Patent
Lee et al.

(10) Patent No.: US 10,790,686 B2
(45) Date of Patent: Sep. 29, 2020

(54) BATTERY PROTECTION SYSTEM AND METHOD

(71) Applicant: LG Chem, Ltd., Seoul (KR)

(72) Inventors: Ki Young Lee, Daejeon (KR); Jae Chan Lee, Daejeon (KR)

(73) Assignee: LG Chem, Ltd. (KR)

( * ) Notice: Subject to any disclaimer, the term of this patent is extended or adjusted under 35 U.S.C. 154(b) by 66 days.

(21) Appl. No.: 16/094,087

(22) PCT Filed: Jul. 20, 2017

(86) PCT No.: PCT/KR2017/007811
§ 371 (c)(1),
(2) Date: Oct. 16, 2018

(87) PCT Pub. No.: WO2018/066792
PCT Pub. Date: Apr. 12, 2018

(65) Prior Publication Data
US 2019/0109471 A1    Apr. 11, 2019

(30) Foreign Application Priority Data

Oct. 5, 2016 (KR) .................. 10-2016-0128492

(51) Int. Cl.
*H02J 7/00* (2006.01)
*B60L 58/10* (2019.01)
(Continued)

(52) U.S. Cl.
CPC .......... *H02J 7/0029* (2013.01); *B60L 3/0046* (2013.01); *B60L 3/0092* (2013.01); *B60L 3/04* (2013.01);
(Continued)

(58) Field of Classification Search
CPC .............. H02J 7/0029; H02J 7/0031; H02J 2007/0039; H02J 9/005; H02J 9/002;
(Continued)

(56) References Cited

U.S. PATENT DOCUMENTS 8,352,804 B2 * 1/2013 Hellwig .................. G06F 13/26
710/260
8,682,525 B1 * 3/2014 Kalinadhabhotla .... G07C 5/008
340/442

(Continued)

FOREIGN PATENT DOCUMENTS

EP          2975724 A1    1/2016
JP          2006020401 A  1/2006
(Continued)

OTHER PUBLICATIONS

Extended European Search Report including Written Opinion for Application No. EP17858587.3 dated Apr. 4, 2019.
(Continued)

*Primary Examiner* — Naum Levin
(74) *Attorney, Agent, or Firm* — Lerner, David, Littenberg, Krumholz & Mentlik, LLP

(57) ABSTRACT

The present invention relates to a system for protecting a battery, and to a battery protecting system, which obtains state information of a battery through two different state obtaining units and diagnoses whether the battery has a problem based on the two elements of state information obtained through the two state obtaining units and reference state information, thereby more certainly diagnosing a state of the battery and stably protecting a load from the battery in the problem state.

11 Claims, 6 Drawing Sheets

(51) Int. Cl.
*B60L 3/04* (2006.01)
*B60L 3/00* (2019.01)
*H01M 2/34* (2006.01)

(52) U.S. Cl.
CPC .............. *B60L 58/10* (2019.02); *H01M 2/348* (2013.01); *H02J 7/0031* (2013.01); *H01M 2200/103* (2013.01); *H01M 2220/20* (2013.01); *H02J 7/00304* (2020.01); *Y02T 10/7005* (2013.01)

(58) Field of Classification Search
CPC ........ H02J 7/00304; B60L 58/10; B60L 3/00; B60L 3/04; B60L 3/0092; B60L 3/0046; B60L 50/50; B60L 53/53; H01M 2/348; H01M 2220/20; H01M 2200/103; H01M 10/42; Y02T 10/7005
See application file for complete search history.

(56) References Cited

U.S. PATENT DOCUMENTS

| | | | | |
|---|---|---|---|---|
| 9,367,420 | B2 * | 6/2016 | Weber | G06F 11/3058 |
| 9,716,520 | B2 * | 7/2017 | Mueller | H04B 15/005 |
| 9,847,653 | B2 * | 12/2017 | Bergmann | H02J 7/0016 |
| 9,966,675 | B2 * | 5/2018 | Wortberg | H01H 85/20 |
| 10,024,921 | B2 * | 7/2018 | Butzmann | H01M 10/48 |
| 10,033,213 | B2 * | 7/2018 | Dulle | H02J 7/007 |
| 10,079,408 | B2 * | 9/2018 | Tzivanopoulos | H01M 10/4285 |
| 10,106,049 | B2 * | 10/2018 | Lupo | B60L 11/1861 |
| 10,209,681 | B2 * | 2/2019 | Obrecht | G05B 23/0259 |
| 10,361,466 | B2 * | 7/2019 | Hinterberger | H01M 2/348 |
| 10,436,852 | B2 * | 10/2019 | Ruiz Sevillano | G01R 31/3835 |
| 2005/0242667 | A1 | 11/2005 | Emori et al. | |
| 2011/0089953 | A1 | 4/2011 | Chandler et al. | |
| 2013/0346783 | A1 * | 12/2013 | Weber | G06F 11/3058 |
| | | | | 713/340 |
| 2014/0015488 | A1 | 1/2014 | Despesse | |
| 2014/0212714 | A1 | 7/2014 | Butzmann | |
| 2014/0324262 | A1 | 10/2014 | Wen | |
| 2014/0358346 | A1 * | 12/2014 | Katrak | G06F 1/26 |
| | | | | 701/22 |
| 2015/0008931 | A1 | 1/2015 | Sugeno et al. | |
| 2015/0012781 | A1 * | 1/2015 | Katrak | G06F 11/24 |
| | | | | 714/37 |
| 2015/0015267 | A1 * | 1/2015 | Mueller | H04B 15/005 |
| | | | | 324/426 |
| 2015/0333541 | A1 | 11/2015 | Butzmann | |
| 2016/0336770 | A1 * | 11/2016 | Benz | H01M 10/425 |
| 2017/0129339 | A1 * | 5/2017 | Krammer | B60L 1/00 |
| 2017/0179738 | A1 * | 6/2017 | Dunsbier | H02J 7/0026 |
| 2018/0062210 | A1 * | 3/2018 | Kim | H01M 10/48 |

FOREIGN PATENT DOCUMENTS

| | | |
|---|---|---|
| JP | 2008141953 A | 6/2008 |
| JP | 2012016094 A | 1/2012 |
| JP | 2012080669 A | 4/2012 |
| JP | 2013162635 A | 8/2013 |
| JP | 2014512636 A | 5/2014 |
| JP | 2015196196 A | 11/2015 |
| KR | 100621072 B1 | 9/2006 |
| KR | 20060120830 A | 11/2006 |
| KR | 20130087779 A | 8/2013 |
| KR | 20140109874 A | 9/2014 |
| KR | 20150143092 A | 12/2015 |
| KR | 20160024514 A | 3/2016 |

OTHER PUBLICATIONS

Search report from International Application No. PCT/KR2017/007811, dated Oct. 27, 2017.

* cited by examiner

BATTERY PROTECTION SYSTEM AND METHOD

The present application is a national phase entry under 35 U.S.C. § 371 of International Application No. PCT/KR2017/007811, filed Jul. 20, 2017, published in Korean, which claims priority from Korean Patent Application No. 10-2016-0128492 filed Oct. 5, 2016, all of which are incorporated herein by reference.

TECHNICAL FIELD

This application claims priority to and the benefit of Korean Patent Application No. 10-2016-0128492 filed in the Korean Intellectual Property Office on Oct. 5, 2016, the entire contents of which are incorporated herein by reference.

The present invention relates to a system for protecting a battery, and to a battery protecting system, which obtains state information of a battery through two different state obtaining units and diagnoses whether the battery has a problem based on the two elements of state information obtained through the two state obtaining units and reference state information, thereby more certainly diagnosing a state of the battery and stably protecting a load from the battery in the problem state.

BACKGROUND ART

According to an increase in demands of a vehicle, a vehicle industry has been developed, and a penetration rate of the vehicle exceeds one per household. With the development of the vehicle industry, the vehicle is electronicized to provide various functions, such as a convenience device, to customers, as well as simply serving as a means for transport, and in production cost of the vehicle, an electronic component is expected to represent an increasing share, that is, 40% for 10 years to 50% for 20 years. However, recently, the vehicle is rapidly electronicized, so that a risk of a vehicle accident due to an electronic error is increased, and a software problem of an electronic component actually causes an erroneous operation of an electronic component, such that an accident is sharply increased. In order to solve the problem, an effort to secure functional safety of an electric and electronic system configuring the vehicle and prevent an accident due to a functional problem of a constituent element of the vehicle has been made.

The newly emerged global technology standard ISO 26262 is the functional safety international standard which is led by the German Association of Automotive Industry (VDA) in Nov. 15, 2011, and newly established by the International Standard of Organization (ISO). ISO 26262 is applied to an electronic component system for a vehicle, thereby providing a safer electronic component system and improving reliability for a vehicle. More particularly, the main contents of ISO 26262 are that a component related to safety in the electronic component system installed in a car (except for a commercial vehicle) of 3,500 kg or less essentially needs to be manufactured under the standard, but when a component is not related to safety even though the component is an electronic component, the component does not correspond to the standard. Particularly, the automotive safety integrity level (ASIL) is one of the four levels specifying requirements required for an item or an element of ISO 26262, and is a safety means applied for preventing excessive residual risk. In ASIL, a highest level of the degree of strictness is indicated as "D" and a lowest level of the degree of strictness is indicated as "A", and the ASIL is determined when a development process starts. A product, which is not satisfied with the level of ASIL, cannot be used or is recognized as a safety deteriorating product, thereby failing to provide trust to customers.

Recently, as an environmental problem is on the rise, demands for an electric vehicle that is an eco-friendly car are increased, and technology of the electric vehicle highly depending on the electronic component system is continuously developed in order to meet the levels by ASIL. Particularly, since the battery is the most important constituent element in the electric vehicle, an electronic component system related to a battery demands a high level of ASIL. Accordingly, an electronic component system, which determines whether the battery has a problem, and controls the battery having the problem and protects a load when the battery has the problem, has been actively developed.

A battery protecting system in the related art, in which a state of a battery is obtained by using an application specific integrated circuit (ASIC), a micro controller unit (MCU), and the like, and whether the battery has a problem is diagnosed based on the obtained state of the battery, may support ASIL A and ASIL B. However, a component satisfying a high level, such as ASIL C and ASIL D, has not been developed yet.

Accordingly, the battery is the important constituent element of a vehicle, so that it is necessary to develop a battery protecting system satisfying a high level, such as ASIL C and ASIL D, and there is a need to supply a safer battery protecting system to customers through the development of the battery protecting system.

DETAILED DESCRIPTION OF THE INVENTION

Technical Problem

An object of the present invention is to provide a battery protecting system for protecting a load in a problem state of a battery, which includes two state obtaining units and obtains state information of a battery, and compares the two elements of obtained state information with reference state information to more accurately determine whether the battery has a problem, thereby securing a higher level of safety.

Technical Solution

According to an exemplary embodiment of the present invention, a battery protecting system includes: a switch unit which is connected with a battery and controls a conduction state of a circuit; a first state obtaining unit and a second state obtaining unit each of which obtains state information of the battery; and a control unit which gathers one or more of the state information obtained by the first state obtaining unit and the state information obtained by the second state obtaining unit, and outputs a switch control signal controlling an open/close state of the switch unit to the switch unit based on the gathered state information and predetermined reference state information, in which the second state obtaining unit diagnoses the state of the battery through the obtained state information and the reference state information, and when it is determined that the diagnosed state of the battery has a problem, the second state obtaining unit outputs a diagnosis result signal to the control unit.

The system may further include a switch driving unit which is connected with the switch unit and changes the open/close state of the switch unit.

The second state obtaining unit may further output the diagnosis result signal to the switch driving unit, and when the switch driving unit receives one or more of the switch control signal output from the control unit and the diagnosis result signal output from the second state obtaining unit, the switch driving unit may change the open/close state of the switch unit.

The second state obtaining unit may always obtain the state of the battery regardless of a change of modes of the first state obtaining unit and the control unit to a sleep mode.

When the control unit receives the diagnosis result signal from the second state obtaining unit in the sleep mode state, the control unit may release the sleep mode.

The control unit may output a diagnosis request signal for diagnosing an erroneous operation of the second state obtaining unit, and the second state obtaining unit may output the obtained state information of the battery to the control unit as a response to the diagnosis request signal, and the control unit may self-diagnose whether the second state obtaining unit is erroneously operated based on the output state information.

The system may further include: a fuse which blocks an overcurrent applied from the battery to the circuit; a temperature fuse unit which is adjacently positioned to the switch unit, and is blocked according to a temperature of the switch unit; and a fuse control unit which controls the fuse, in which the fuse control unit may block the fuse based on a signal output according to the block of the temperature fuse unit.

According to another exemplary embodiment of the present invention, a method of protecting a battery includes: obtaining, by a first state obtaining unit, state information of a battery; obtaining, by a second state obtaining unit, state information of the battery; providing the state information obtained from the first and second state obtaining units to a control unit; gathering, by the control unit, one or more of the state information obtained by the first and second state obtaining units; and outputting, by the control unit, a switch control signal controlling an open/close state of a switch unit based on the gathered state information and predetermined reference state information, in which the providing of the obtained state information to the control unit includes: diagnosing, by the second state obtaining unit, the state of the battery based on the obtained state information and the reference state information; and when the second state obtaining unit determines that the diagnosed state of the battery has a problem, outputting a diagnosis result signal to the control unit.

The method may further include changing, by a switch driving unit, an open/close state of the switch unit, in which the changing of the open/close state may include: receiving the diagnosis result signal from the second state obtaining unit; receiving the switch control signal from the control unit; and when one or more of the switch control signal output from the control unit and the diagnosis result signal output from the second state obtaining unit are received, changing the open/close state of the switch unit.

The method may further include when the control unit receives the diagnosis result signal from the second state obtaining unit in a sleep mode state, releasing the sleep mode.

The method may further include: outputting, by the control unit, a diagnosis request signal diagnosing an erroneous operation of the second state obtaining unit; outputting, by the second state obtaining unit, the obtained state information of the battery to the control unit as a response to the diagnosis request signal; and self-diagnosing, by the control unit, whether the second state obtaining unit is erroneously operated based on the output state information.

Advantageous Effects

According to one aspect of the present invention, it is possible to provide a battery protecting system for protecting a load in a problem state of a battery, which includes two state obtaining units and obtains state information of a battery, and compares the two elements of obtained state information with reference state information to more accurately determine whether the battery has a problem, thereby securing a higher level of safety.

MODE FOR CARRYING OUT THE INVENTION

The present invention will be described in detail below with reference to the accompanying drawings. Herein, repeated descriptions and the detailed description of a publicly known function and configuration that may make the gist of the present invention unnecessarily ambiguous will be omitted. Exemplary embodiments of the present invention are provided so as to more completely explain the present invention to those skilled in the art. Accordingly, the shape, the size, etc., of elements in the figures may be exaggerated for a clearer explanation.

Throughout the specification, unless explicitly described to the contrary, the word "include/comprise" and variations such as "includes/comprises" or "including/comprising" mean further including other constituent elements, not excluding the other constituent elements.

In addition, the term " . . . unit" described in the specification means a unit for processing at least one function and operation and may be implemented by hardware components or software components and combinations thereof.

Figure 1:
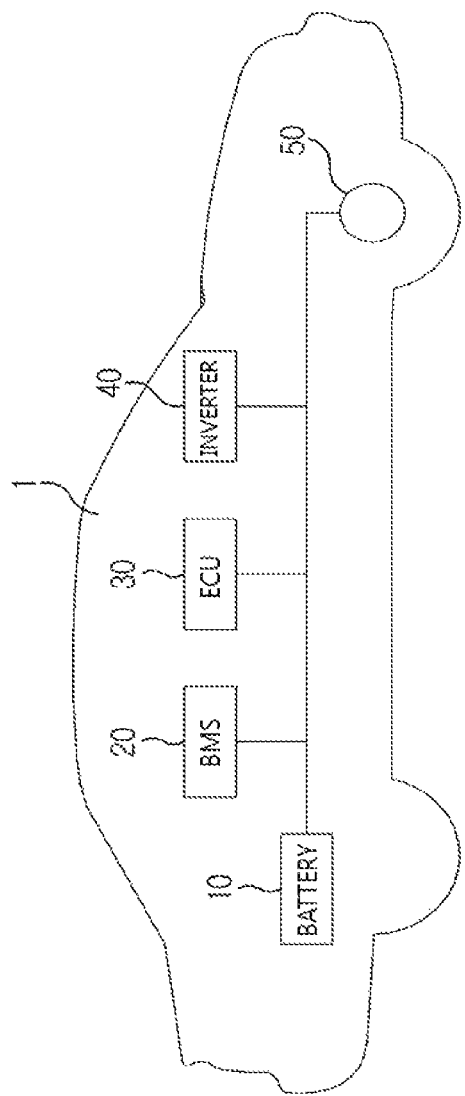
FIG. 1 is a diagram schematically illustrating an electric vehicle to which a battery protecting system according to an exemplary embodiment of the present invention is applicable.

FIG. 1 is a diagram schematically illustrating an electric vehicle to which a battery protecting system according to an exemplary embodiment of the present invention is applicable.

FIG. 1 illustrates an example, in which a battery protecting system 100 according to the exemplary embodiment of the present invention is applied to an electric vehicle 1, but the battery protecting system according to the exemplary embodiment of the present invention is applicable to any technical field, such as an energy storage system (ESS) for household or industry or an uninterruptible power supply (UPS) system, to which a secondary battery is applicable, in addition to the electric vehicle.

The electric vehicle 1 may include a battery 10, a battery management system (BMS) 20, an electronic control unit (ECU) 30, an inverter 40, and a motor 50.

The battery 10 is an electric energy source for driving the electric vehicle 1 by providing driving force to the motor 50. The battery 10 may be charged or discharged by the inverter 40 according to the driving of the motor 50 and/or an internal combustion engine (not illustrated).

Herein, the kind of battery 10 is not particularly limited, and examples of the battery 10 may include a lithium ion battery, a lithium polymer battery, a nickel cadmium battery, a nickel hydrogen battery, a nickel zinc battery, and the like.

Further, the battery 10 is formed of a battery pack, in which a plurality of battery cells is connected in series and/or in parallel. Further, the battery 10 may include one or more battery packs.

The BMS 20 estimates a state of the battery 10, and manages the battery 10 by using information on the estimated state. For example, the BMS 20 estimates and manages state information of the battery 10, such as a state of charging (SOC), a state of health (SOH), the amount of maximum input/output allowance power, and an output voltage of the battery 10. Further, the BMS 20 controls a charge or a discharge of the battery 10 by using the state information, and further, a replacement time of the battery 10 may be estimated.

The BMS 20 may include the battery protecting system 100 according to the exemplary embodiment of the present disclosure which is to be described below or may be operated while being connected with the battery protecting system. The BMS 20 may obtain state information of the battery by using first and second state obtaining units included in the battery protecting system 100, and may determine an abnormal operation state of the battery 10 based on the obtained state information.

The ECU 30 is an electronic control device for controlling a state of the electric vehicle 1. For example, the ECU 30 determines a torque level based on information about an accelerator, a brake, a speed, and the like, and controls an output of the motor 50 to correspond to torque information.

Further, the ECU 30 transmits a control signal to the inverter 40 so that the battery 10 is charged or discharged by the BMS 20.

The inverter 40 makes the battery 10 be charged or discharged based on a control signal of the ECU 30.

The motor 50 drives the electric vehicle 1 based on control information (for example, the torque information) transmitted from the ECU 30 by using electric energy of the battery 10.

Hereinafter, the battery protecting system 100 according to the exemplary embodiment of the present invention will be described with reference to FIGS. 2 and 3.

Figure 2:
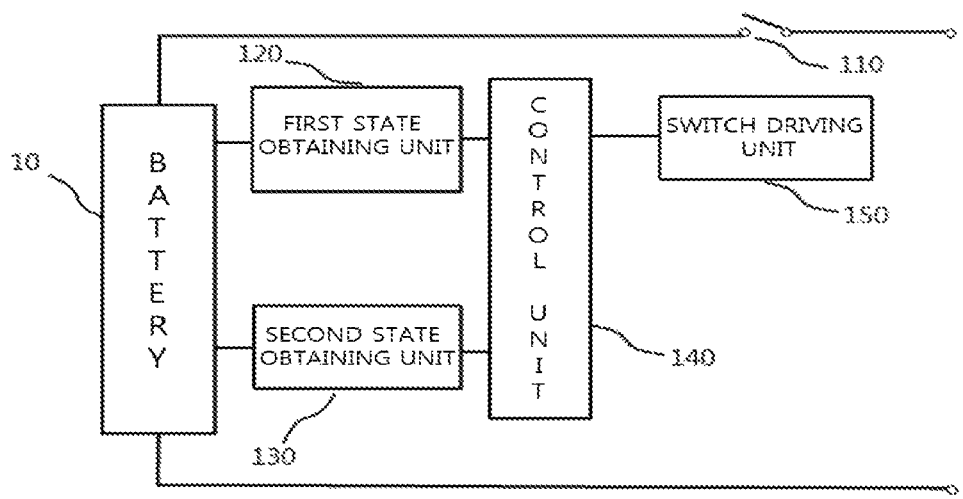
FIG. 2 is a diagram schematically illustrating the battery protecting system according to the exemplary embodiment of the present invention.

FIG. 2 is a diagram schematically illustrating the battery protecting system according to the exemplary embodiment of the present invention.

Referring to FIG. 2, the battery protecting system 100 according to the exemplary embodiment of the present invention may include a switch unit 110, a first state obtaining unit 120, a second state obtaining unit 130, a control unit 140, and a switch driving unit 150.

The battery protecting system 100 illustrated in FIG. 2 is in accordance with the exemplary embodiment, and the constituent elements of the battery protecting system 100 are not limited to the exemplary embodiment illustrated in FIG. 2, and may be added, changed, or deleted as necessary.

The switch unit 110 may be connected with the battery 10 and control a conduction state of a circuit. Herein, the conduction state may be a state where a circuit is connected or is short-circuited according to on or off of the switch unit 110. For example, the switch unit 110 may be a switching device, such as a relay, a contactor, a transistor, and a thyristor, and may be formed of one or more switching devices according to a demand of a user and a use environment.

The first state obtaining unit 120 may obtain state information of the battery 10. Herein, the state information means information obtained for diagnosing a problem of the battery 10. For example, the state information may include one or more of a voltage, a current, a temperature, a residual capacity, and a residual life of the battery 10. The first state obtaining unit 120 includes a constituent element obtaining one or more elements of state information among the state information of the battery 10, thereby obtaining one or more elements of state information of the battery 10.

The second state obtaining unit 130 may obtain state information of the battery 10, similar to the first state obtaining unit 120. Further, the second state obtaining unit 130 includes a constituent element obtaining one or more elements of state information among the state information of the battery 10, identically to the first state obtaining unit 120, thereby obtaining one or more elements of state information of the battery 10. According to the exemplary embodiment, the first state obtaining unit 120 and the second state obtaining unit 130 may obtain different state information of the battery 10. For example, a voltage value of the battery 10 may be obtained through the first state obtaining unit 120, and a current and a temperature of the battery 10 may be obtained through the second state obtaining unit 130. According to another exemplary embodiment, the first state obtaining unit 120 and the second state obtaining unit 130 obtain the same state information of the battery 10, thereby more accurately obtaining state information.

Further, the second state obtaining unit 130 may diagnose a state of the battery 10 through the obtained state information of the battery 10 and reference state information. When it is determined that the battery 10 has a problem, the second state obtaining unit 130 may output a diagnosis result signal to the control unit 140 which is to be described below. Herein, the diagnosis result signal may be a signal notifying the control unit 140 which is to be described below that the battery 10 has the problem. For example, the second state obtaining unit 130 provides the control unit 140 with the obtained state information and simultaneously diagnoses the state of the battery 10 through the obtained state information, and when the battery 10 has the problem as a result of the diagnosis, the second state obtaining unit 130 outputs a diagnosis result signal to the control unit 140, thereby more certainly determining whether the battery 10 has a problem.

The control unit 140 may gather one or more of the state information of the battery 10 obtained by the first state obtaining unit 120 and the second state obtaining unit 130. The control unit 140 may control an open/close state of the switch unit 110 through the gathered state information of the battery 10 and predetermined reference state information. Herein, the predetermined reference state information is reference information which is preset and stored for determining whether the battery 10 has a problem through the state information of the battery 10 obtained from the first state obtaining unit 120 and the second state obtaining unit 130. For example, when the obtained state information of the battery 10 is a temperature, the reference state information may be −20° that is a minimum allowable temperature of the battery 10 and 60° that is a maximum allowable temperature of the battery 10, and when the obtained temperature of the battery 10 is less than −20° or is higher than 60°, the control unit 140 may diagnose that the battery 10 is in a problem state.

When it is determined that the battery 10 is in the problem state through the state information obtained from the first state obtaining unit 120 and the second state obtaining unit 130, the control unit 140 may output a switch control signal to the switch driving unit 150 which is to be described below to control the switch unit 110. Herein, the switch control signal is a signal controlling the switch unit 110 in order to protect a load from the battery 10 in the problem state. For example, when the control unit 140 diagnoses that the battery 10 is in an over-voltage state, the switch control signal may be a switch off signal which switches off one or more switching devices included in the switch unit 110 to separate the battery 10 and a load.

In the battery protecting system 100 according to the exemplary embodiment of the present invention, the first state obtaining unit 120 and the control unit 140 may be in a sleep mode state after a predetermined time according to a user and a use environment in a design. Herein, the predetermined time may be a value set by a manufacturer of the battery protecting system 100 according to the exemplary embodiment of the present invention, or a value set and changed according to a user and a use environment. For example, the first state obtaining unit 120 may be one or more application specific integrated circuits (ASIC), and the control unit 140 may be one or more micro controller units (MCU). Further, the predetermined time may be 30 minutes. When a standby time exceeds 30 minutes that is the predetermined time until a next external event is generated after the ASIC and the MCU perform basic processing operation, the ASIC and the MCU performs only a minimum function to be in a sleep mode state for decreasing power consumption. In the sleep mode, the control unit 140 may not perform an operation of monitoring a state of the battery 10 in order to decrease power consumption. As described above, when the control unit 140 is in the sleep mode state, the control unit 140 may not continuously monitor the state of the battery 10 and rapidly determine whether the battery 10 is in the problem state through the monitored state, so that there may be a difficulty in rapidly controlling the switch unit 110 to be off and protecting a load from the battery 10 in the problem state.

In order to solve the problem, the second state obtaining unit 130 may always obtain the state of the battery regardless of a change of the sleep mode of the first state obtaining unit 120 and the control unit 140. Further, the diagnosis result signal output from the second state obtaining unit 130 may be a driving signal by which the control unit 140 releases the sleep mode from the sleep mode state and is operated. For example, when the standby time exceeds 30 minutes until a next external event is generated, the first state obtaining unit 120 and the control unit 140 may be in the sleep mode state, and even when the first state obtaining unit 120 and the control unit 140 are in the sleep mode state, the second state obtaining unit 130 may always obtain the state information of the battery 10. In the case where a problem is generated in the battery 10 when the first state obtaining unit 120 and the control unit 140 are in the sleep mode, the second state obtaining unit 130 may output a diagnosis result signal to the control unit 140, and the first state obtaining unit 120 and the control unit 140 may release the sleep mode through the output diagnosis result signal. Accordingly, the first state obtaining unit 120 and the control unit 140 may obtain the state of the battery 10 and control the switch unit 110, thereby protecting a load from the battery 10 in the problem state.

Further, the second state obtaining unit 120 may directly output the diagnosis result signal to the switch driving unit 150 to be described below. In this case, the diagnosis result signal is a signal which may control the switch unit 110 to be on or off, similar to the switch control signal output from the control unit 140. As described above, the second state obtaining unit 120 may directly output the diagnosis result signal which may control the switch unit 110 to be on or off to the switch driving unit 150 which is to be described below, so that it is possible to rapidly protect a load from the battery 10 in the problem state even when the control unit 140 is in the sleep mode.

The switch driving unit 150 may be connected with the switch unit 110 and change an open/close state of the switch unit 110. The switch driving unit 150 may control the switch unit 110 to be on or off through the switch control signal output from the control unit 140, and when the first state obtaining unit 120 and the control unit 140 are in the sleep mode, the switch driving unit 150 may receive the diagnosis result signal from the second state obtaining unit 130 and control the switch unit 110 to be on or off. As described above, when the switch driving unit 150 receives one or more of the switch control signal output from the control unit 140 and the diagnosis result signal output from the second state obtaining unit 130, the switch driving unit 150 changes an open/close state of the switch unit 110.

Additionally, the control unit 140 may output a diagnosis request signal for diagnosing an erroneous operation of the second state obtaining unit, and the second state obtaining unit 130 may output the obtained state information of the battery 10 to the control unit 140 as a response to the diagnosis request signal. Based on this, the control unit 140 may autonomously diagnose whether the second state obtaining unit is erroneously operated. Herein, the diagnosis request signal may be a signal for diagnosing whether the second state obtaining unit is erroneously operated. For example, when the battery 10 is in a normal state, the control unit 140 may output the diagnosis request signal to the second state obtaining unit 130, and the second state obtaining unit 130 may obtain the state of the battery 10 based on the input diagnosis request signal and output the obtained state of the battery 10 to the control unit 140. The control unit 140 may compare the state information of the battery 10 obtained from the second state obtaining unit 130 and the state information of the battery 10 obtained from the first state obtaining unit 120 with the reference state information. According to the exemplary embodiment, the first state obtaining unit 120 may compare the obtained state information of the battery 10 with the reference state information and diagnose the state of the battery 10. When the battery 10 is in a normal state as a result of the diagnosis, the control unit 140 may set an allowable error range based on the state information obtained from the first state obtaining unit 120. For example, when the temperature of the battery 10 obtained from the first state obtaining unit is 40°, an allowable error range may be set to be 35° to 45°. The control unit 140 may determine whether the state information of the battery 10 obtained from the second state obtaining unit 130 is within the set allowable error range. The control unit 140 may diagnose whether the second state obtaining unit 130 is erroneously operated based on the result of the determination.

Figure 3:
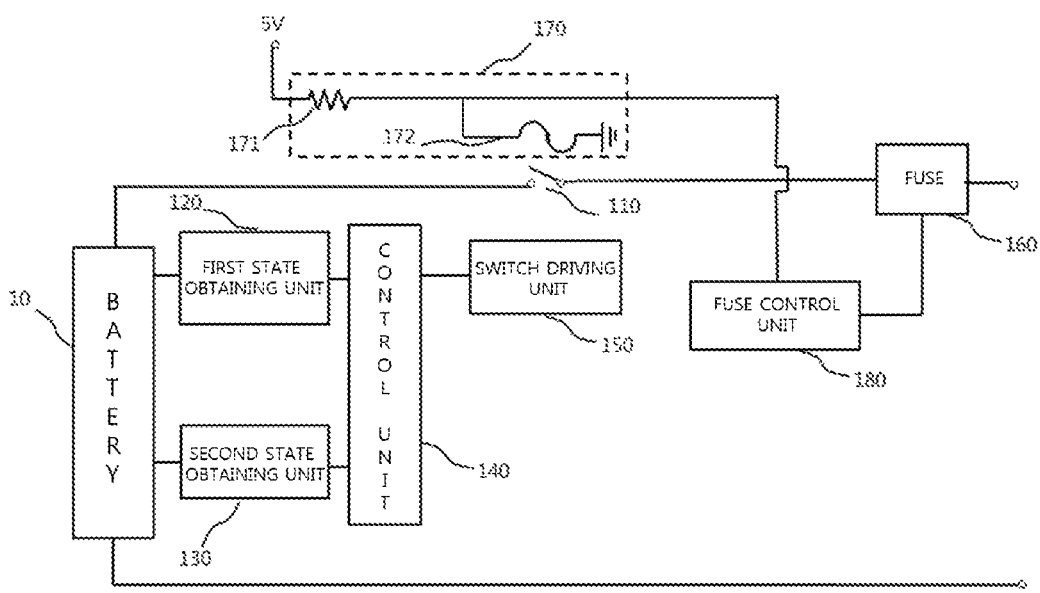
FIG. 3 is a diagram schematically illustrating a battery protecting system according to another exemplary embodiment of the present invention.

FIG. 3 is a diagram schematically illustrating a battery protecting system according to another exemplary embodiment of the present invention.

Referring to FIG. 3, a battery protecting system according to another exemplary embodiment of the present invention may further include a fuse 160, a temperature fuse unit 10, and a fuse control unit 170.

When an overcurrent flows from a battery 10 in a circuit, the fuse 160 may block the overcurrent, and the overcurrent is blocked through the fuse control unit 170 which is to be described below to protect a load from the battery 10.

The temperature fuse unit 170 may be adjacently positioned to a switch unit 110, and may be blocked according to a temperature of the switch unit 110, and when the temperature fuse unit 170 is blocked, the temperature fuse unit 170 may output a signal to the fuse control unit 180 which is to be described below. To this end, the temperature fuse unit 170 may include a resistor 171 and a temperature fuse 172.

The resistor 171 may be connected to a voltage and the temperature fuse 172 outside the battery 10 as illustrated in FIG. 3. Further, the resistor 171 may be connected with the fuse control unit 180 which is to be described below.

The temperature fuse 172 may be adjacently positioned to the switch unit 110, and when a temperature of the switch unit 110 is equal to or higher than a rated value of the temperature fuse, the temperature fuse 172 may be blocked.

The fuse control unit 180 may block the fuse 160 based on a signal output according to the blocking of the temperature fuse 172. Herein, the signal may be a signal for blocking the fuse 170 which is formed to additionally protect a load when the switch unit 110 has a problem and fails to normally perform an on or off operation. For example, the output signal may be an electric signal.

When the problem is generated in the battery 10, the switch unit 110 needs to be operated to be off to protect a load, but when the switch unit 110 is in a high temperature state which exceeds an allowable range, the off operation of the switch unit 110 is not properly performed, thereby failing to protect the load from the battery 10 having the problem. In this case, it is possible to protect the load from the battery 10 having the problem by turning off the additionally provided fuse 160. The temperature fuse 172 may be connected with the resistor 171 and a ground to make a current flowing in the resistor connected with the external voltage of the battery 10 flow in a direction of the ground. Since the temperature fuse 172 has lower internal resistance than that of the fuse control unit 180, the current flowing through the resistor 171 may flow through the temperature fuse 172. However, when the temperature of the switch unit 110 exceeds the allowable range and thus the temperature fuse 172 is blocked, the current flowing through the resistor 171 may flow only to the fuse control unit 180. The fuse control unit 180 may recognize the changed current quantity as a signal and block the fuse 160 based on the signal, thereby protecting the load from the battery 10.

Hereinafter, a battery protecting method S100 according to the exemplary embodiment of the present invention will be described with reference to FIGS. 4 to 7.

Figure 4:
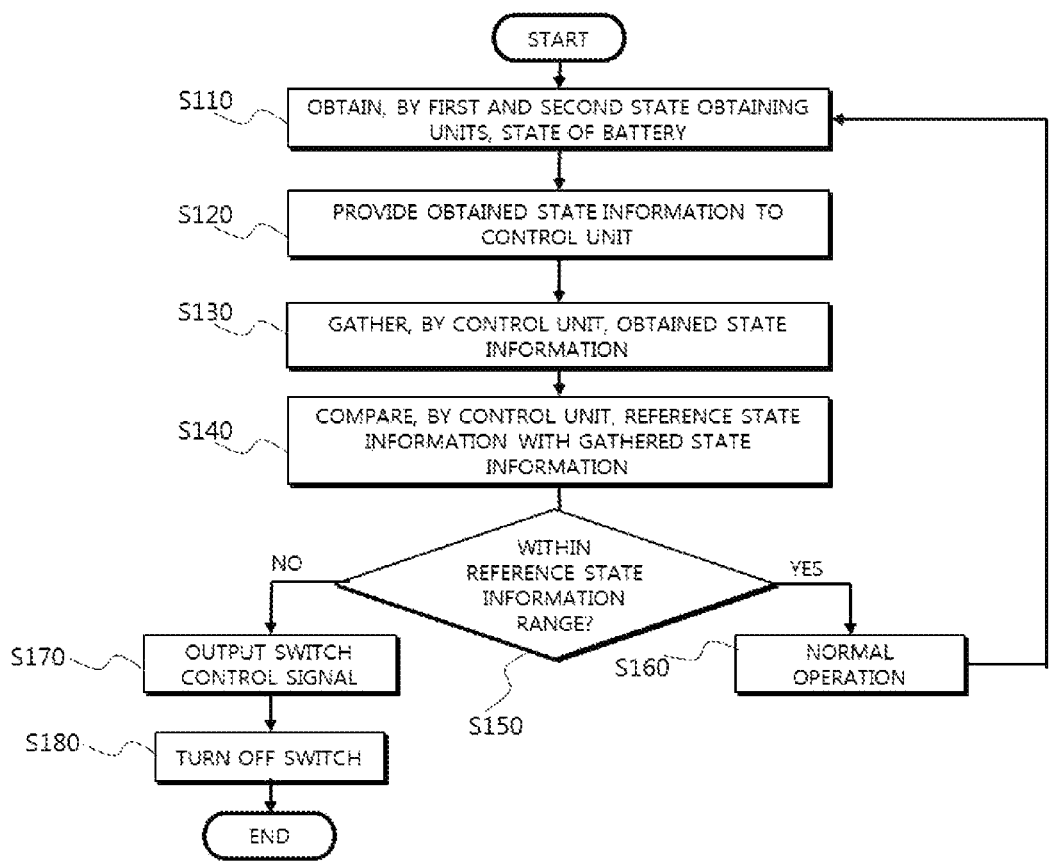
FIG. 4 is a flowchart briefly illustrating a battery protecting method according to an exemplary embodiment of the present invention.

FIG. 4 is a flowchart briefly illustrating a battery protecting method according to an exemplary embodiment of the present invention.

Referring to FIG. 4, a battery protecting method S100 according to the exemplary embodiment of the present invention may include obtaining a state of a battery from the first and second state obtaining units (S110), providing the state information obtained from the first and second state obtaining units to the control unit (S120), gathering, by the control unit, one or more of the state information obtained by the first and second state obtaining units (S130), comparing, by the control unit, the gathered state information with predetermined reference state information (S150), and outputting a switch control signal controlling an open/close state of the switch unit (S170).

Hereinafter, the battery protecting method S100 according to the exemplary embodiment of the present invention will be described in detail with reference to FIGS. 5 to 7.

Figure 5:
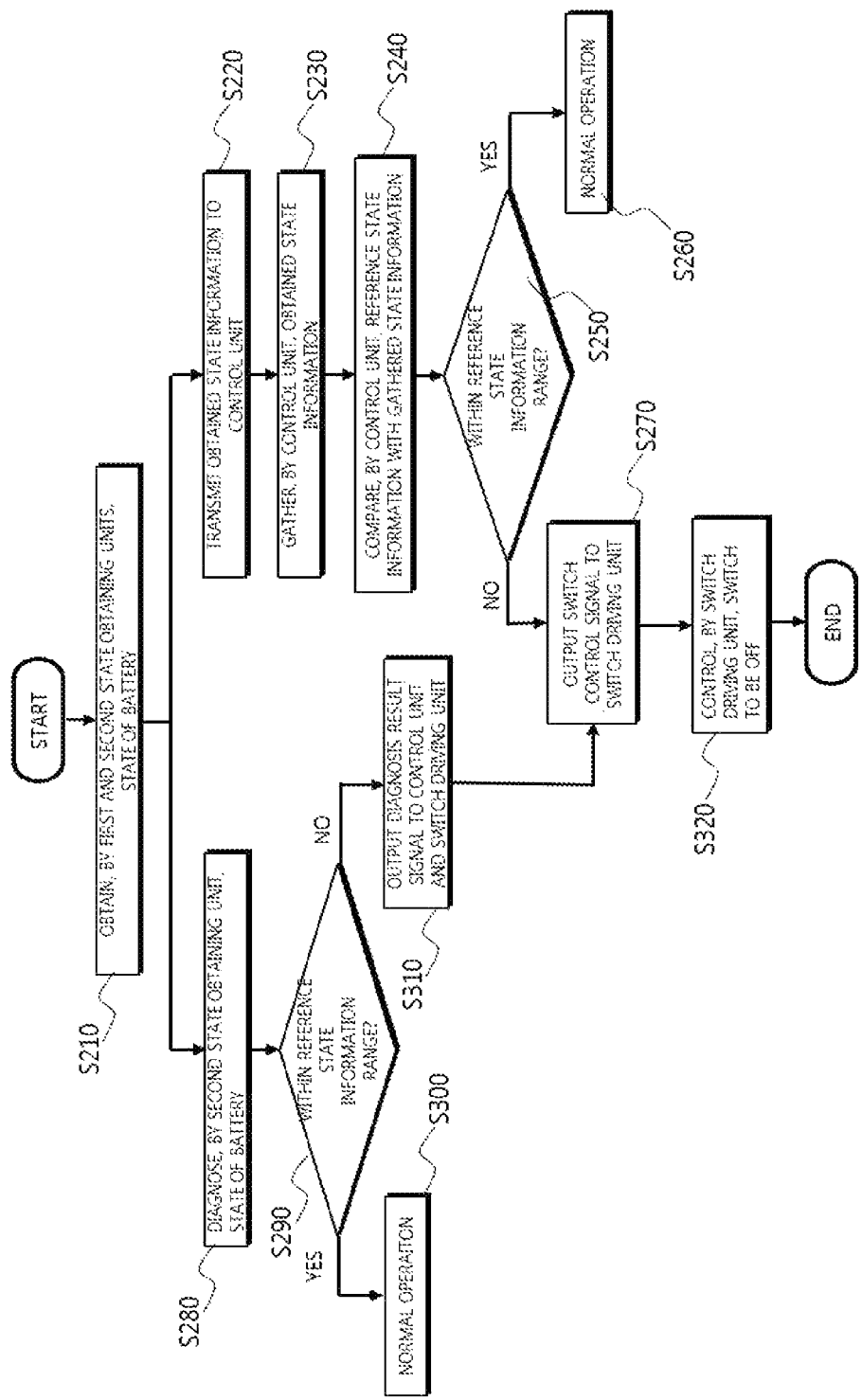
FIG. 5 is a flowchart briefly illustrating the battery protecting method according to the exemplary embodiment of the present invention in more detail.

FIG. 5 is a flowchart illustrating the battery protecting method according to the exemplary embodiment of the present invention in more detail.

Referring to FIG. 5, when the battery protecting method S100 according to the exemplary embodiment of the present invention is initiated, the first and second state obtaining units obtain a state of the battery (S210). The two elements of state information of the battery obtained in operation S210 are transmitted to the control unit (S220). Then, the control unit gathers the obtained state information of the battery (S230). Then, the state information of the battery gathered in operation S230 and reference state information are compared (S240). As a result of the comparison through operation S240, when the state information of the battery is within a range of the reference state information, the control unit controls the battery to be normally operated (S250 and S260), and when the state information of the battery is not within the range of the reference state information, the control unit outputs a switch control signal to the switch driving unit (S270).

Further, the second state obtaining unit diagnoses the state of the battery based on the state information of the battery obtained by the second state obtaining unit (S280). The second state obtaining unit determines whether the state information is included in the range of the reference state information based on the state information obtained in operation S290 and the reference state information (S290). When it is determined that the state information of the battery is included in the range of the reference state information through operation S290, the second state obtaining unit makes the battery be normally operated (S300). When it is determined that the state information of the battery is not included in the range of the reference state information through operation S290, the second state obtaining unit outputs a diagnosis result signal to the control unit and the switch driving unit (S310).

Then, the switch driving unit controls on/off of the switch unit based on the switch control signal output from the control unit and the diagnosis result signal output from the second state obtaining unit (S320).

Figure 6:
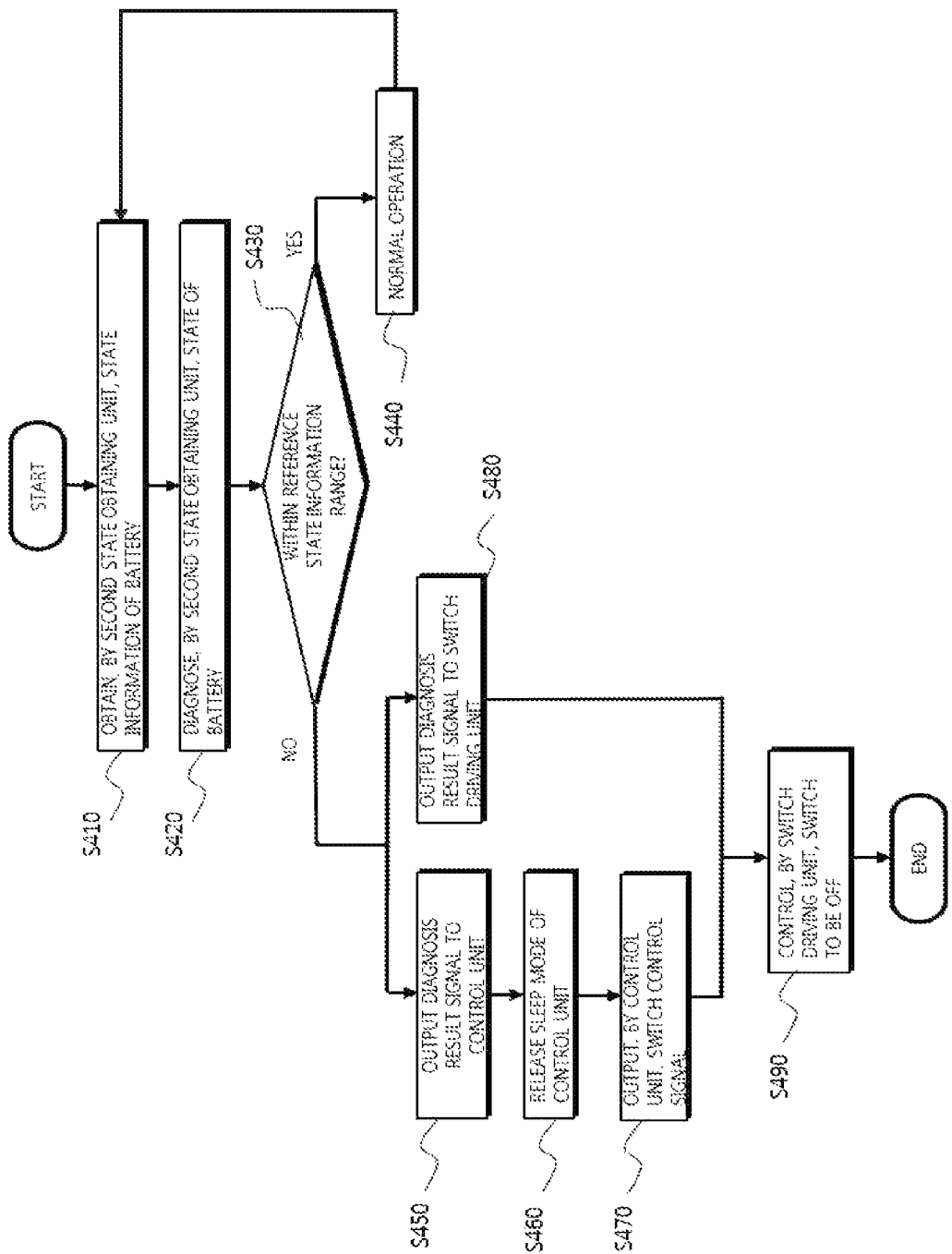
FIG. 6 is a flowchart illustrating the case where a first state obtaining unit and a control unit are in a sleep mode in the battery protecting method according to the exemplary embodiment of the present invention.

FIG. 6 is a flowchart illustrating the case where the first state obtaining unit and the control unit are in a sleep mode in the battery protecting method according to the exemplary embodiment of the present invention.

Referring to FIG. 6, in the battery protecting method according to the exemplary embodiment of the present invention, when the first state obtaining unit and the control unit are in a sleep mode, the second state obtaining unit may obtain a state of the battery (S410). The second state obtaining unit diagnoses the state information of the battery obtained in operation S410 (S420), and operation S430 is performed based on the state information of the battery and reference state information to diagnose the state of the battery. When the battery has no problem as a result of the diagnosis, the control unit makes the battery be normally operated (S440). When the battery has the problem, the second state obtaining unit outputs a diagnosis result signal to the control unit (S450) to release the sleep mode of the control unit (S460). The control unit, which is released from the sleep mode, performs operations S110 to S150 illustrated in FIG. 5 to diagnoses the state of the battery. When the battery has the problem, the control unit outputs a switch control signal for controlling the switch unit (S470). Additionally, the second state obtaining unit directly outputs the diagnosis result signal to the switch driving unit (S480).

Then, the switch driving unit controls on/off of the switch unit based on the switch control signal output from the control unit and the diagnosis result signal output from the second state obtaining unit (S490).

Figure 7:
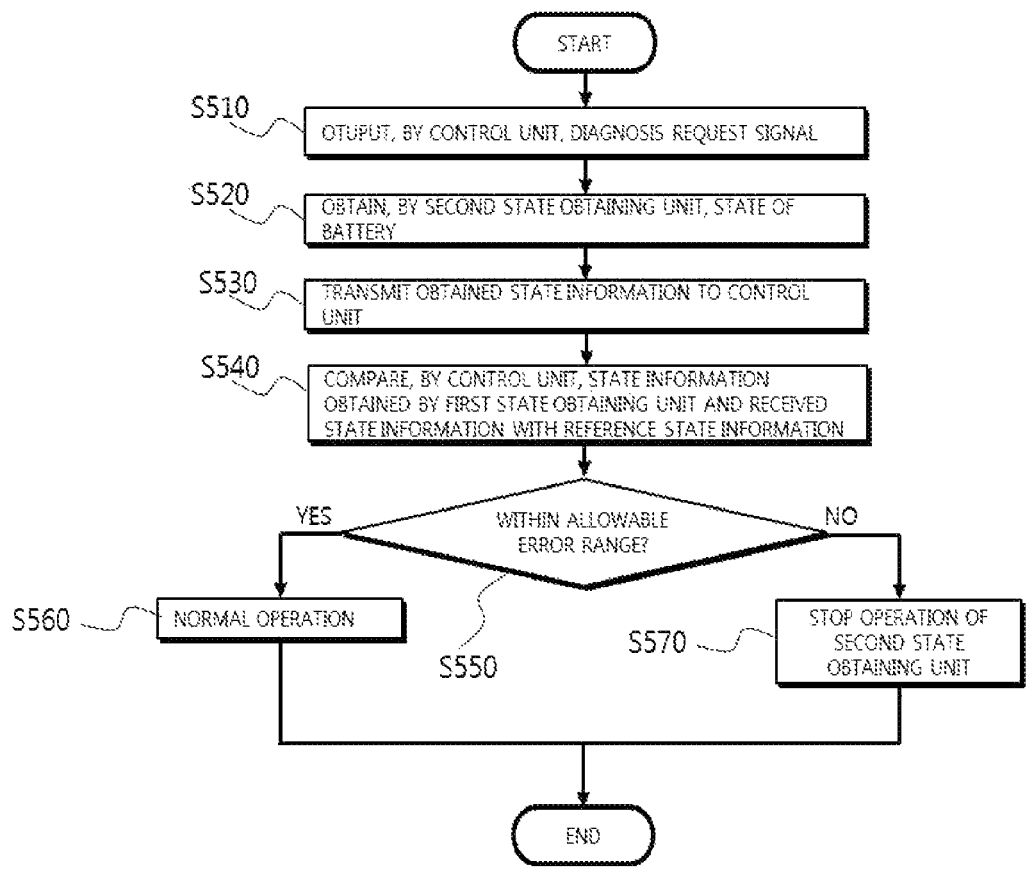
FIG. 7 is a flowchart illustrating a self-diagnosing method of a second state obtaining unit in the battery protecting method according to the exemplary embodiment of the present invention.

FIG. 7 is a flowchart illustrating a self-diagnosing method of the second state obtaining unit in the battery protecting method according to the exemplary embodiment of the present invention.

Referring to FIG. 7, in the battery protecting method according to the exemplary embodiment of the present invention, when a self-diagnosing operation of the second state obtaining unit is initiated, the control unit outputs a diagnosis request signal (S510). When the diagnosis request signal is input from the control unit, the second state obtaining unit obtains a state of the battery (S520). The second state obtaining unit transmits the obtained state information of the battery to the control unit (S530). The control unit compares the transmitted state information of the battery and the state information of the battery obtained by the first state obtaining unit with the reference state information (S540). It is confirmed whether the battery is normally operated by comparing the state information obtained by the first state obtaining unit with the reference state information. When the battery is normally operated, an allowable error range is set based on the state information obtained from the first state obtaining unit. The control unit determines whether the state information obtained from the second state obtaining unit is included within the set allowable error range. When the state information obtained from the second state obtaining unit is within the set allowable error range as a result of the determination, the second state obtaining unit performs a normal operation (S560). When the state information obtained from the second state obtaining unit is not within the set allowable error range, an operation of the second state obtaining unit is stopped (S570).

The foregoing battery protecting method S100 has been described with reference to the flowchart presented in the drawing. For the simple description, the method is illustrated in a series of blocks and described, but the present invention is not limited to the sequence of the blocks, and some blocks may be performed in a different order or at the same time as that of other blocks illustrated and described in the present specification, and various branches, flow paths, and block sequences achieving the same or similar result may be carried out. Further, all of the blocks illustrated for carrying out the method described in the present specification may not be required.

In the forgoing, the specific exemplary embodiment of the present invention has been illustrated and described, but it is apparent to those skilled in the art that the technical spirit of the present invention is not limited by the accompanying drawings and the described contents, and may be modified in various forms without departing from the spirit of the present invention, and the modifications are considered to belong to the claims of the present invention without departing from the spirit of the present invention.

The invention claimed is:

1. A system for protecting a battery, the system comprising:
   a switch unit which is connected with a battery and configured to control a conduction state of a circuit;
   a first state obtaining unit configured to obtain first state information of the battery;
   a second state obtaining unit configured to obtain second state information of the battery; and
   a control unit configured to:
      receive the obtained first state information from the first state obtaining unit and the obtained second state information from the second state obtaining unit; and
      output a switch control signal controlling an open/close state of the switch unit to the switch unit based on the received first and second state information and predetermined reference state information,
   wherein the second state obtaining unit is configured to control transmission of a diagnosis result signal from the second state obtaining unit to the control unit based on the obtained second state information, wherein the diagnosis result signal is transmitted when comparison of the obtained second state information to the predetermined reference state information indicates that the battery has a problem.

2. The system of claim 1, further comprising:
   a switch driving unit which is connected with the switch unit and configured to change the open/close state of the switch unit.

3. The system of claim 2, wherein the second state obtaining unit is further configured to output the diagnosis result signal to the switch driving unit, and
   when the switch driving unit receives one or more of the switch control signal output from the control unit and the diagnosis result signal output from the second state obtaining unit, the switch driving unit is configured to change the open/close state of the switch unit.

4. The system of claim 1, wherein the first state obtaining unit is configured to enter a sleep mode, whereby first state information is not collected in the sleep mode, and wherein the second state obtaining unit is configured to continue to obtain the second state information when the first state obtaining unit enters the sleep mode.

5. The system of claim 1, wherein the control unit is configured to:
   enter a sleep mode; and
   in response to receiving the diagnosis result signal, exit the sleep mode and receive the first state information of the battery from the first state obtaining unit.

6. The system of claim 1, wherein the control unit is configured to output a diagnosis request signal for diagnosing an erroneous operation of the second state obtaining unit, and the second state obtaining unit outputs the obtained state information of the battery to the control unit as a response to the diagnosis request signal, and
   the control unit is configured to self-diagnose whether the second state obtaining unit is erroneously operated based on the output state information.

7. The system of claim 1, further comprising:
   a fuse which blocks an overcurrent applied from the battery to the circuit;
   a temperature fuse unit which is adjacently positioned to the switch unit, and is blocked according to a temperature of the switch unit; and a fuse control unit which is configured to control the fuse,
wherein the fuse control unit is configured to block the fuse based on a signal output according to the block of the temperature fuse unit.

8. A method of protecting a battery, the method comprising:
- obtaining, by a first state obtaining unit, first state information of a battery;
- obtaining, by a second state obtaining unit, second state information of the battery;
- providing the first and second state information obtained from the first and second state obtaining units, respectively, to a control unit;
- receiving, by the control unit, the first and second state information obtained by the first and second state obtaining units, respectively; and
- outputting, by the control unit, a switch control signal controlling an open/close state of a switch unit based on the received first and second state information and predetermined reference state information,
- wherein the providing of the second state information to the control unit includes:
- controlling, by the second state obtaining unit, transmission of a diagnosis result signal from the second state obtaining unit to the control unit based on based on a comparison of the obtained second state information to the predetermined reference state information, wherein the diagnosis result signal is transmitted when the comparison indicates that the battery has a problem.

9. The method of claim 8, further comprising:
- changing, by a switch driving unit, an open/close state of the switch unit,
- wherein the changing of the open/close state includes:
- receiving the diagnosis result signal from the second state obtaining unit;
- receiving the switch control signal from the control unit; and
- when one or more of the switch control signal output from the control unit and the diagnosis result signal output from the second state obtaining unit are received, changing the open/close state of the switch unit.

10. The method of claim 8, further comprising:
- releasing, by the control unit, a sleep mode of the control unit in response to receiving the diagnosis result signal from the second state obtaining unit.

11. The method of claim 8, further comprising:
- outputting, by the control unit, a diagnosis request signal diagnosing an erroneous operation of the second state obtaining unit;
- outputting, by the second state obtaining unit, the obtained second state information of the battery to the control unit as a response to the diagnosis request signal; and
- self-diagnosing, by the control unit, whether the second state obtaining unit is erroneously operated based on the output second state information.

* * * * *